United States Patent [19]
Wada et al.

[11] Patent Number: 4,808,455
[45] Date of Patent: * Feb. 28, 1989

[54] MAGNETIC RECORDING DISC AND PROCESS FOR PRODUCING THE SAME

[75] Inventors: Toshiaki Wada, Takatsuki; Yoshiaki Katsuyama, Yamatotakada; Junichi Nakaoka, Amagasaki, all of Japan

[73] Assignee: Sumitomo Special Metals Co., Ltd., Osaka, Japan

[*] Notice: The portion of the term of this patent subsequent to Sep. 1, 2004 has been disclaimed.

[21] Appl. No.: 932,367

[22] Filed: Nov. 19, 1986

[30] Foreign Application Priority Data

Nov. 20, 1985 [JP] Japan .................. 60-260768

[51] Int. Cl.$^4$ .................. G11B 5/82; G11B 5/72
[52] U.S. Cl. .................. 428/64; 204/192.15; 204/192.16; 204/192.2; 204/192.23; 427/128; 427/129; 427/130; 427/131; 427/132; 428/65; 428/141; 428/426; 428/433; 428/318.4; 428/319.1; 428/428; 428/694; 428/704; 428/900
[58] Field of Search ............ 428/64, 65, 432, 433, 428/698, 694, 695, 701, 699, 426, 318.4, 319.1, 428, 141, 336, 408, 704; 427/128, 131, 132, 129, 130; 204/192.15, 192.16, 192.2, 192.23

[56] References Cited

U.S. PATENT DOCUMENTS

| | | | |
|---|---|---|---|
| 3,198,657 | 8/1965 | Kimball et al. | 427/128 |
| 3,656,229 | 4/1972 | Sakurai | 428/900 |
| 3,959,553 | 5/1976 | Hartmann et al. | 428/900 |
| 4,046,932 | 9/1977 | Hartmann et al. | 428/900 |
| 4,254,189 | 3/1981 | Fisher | 428/900 |
| 4,396,682 | 8/1983 | Mohri et al. | 428/900 |
| 4,411,963 | 10/1983 | Aine | 428/694 |
| 4,448,842 | 5/1984 | Yamaguchi | 428/694 |
| 4,528,212 | 7/1985 | Cairns et al. | 428/701 |
| 4,540,638 | 9/1985 | Sakakihara | 428/694 |
| 4,608,293 | 8/1986 | Wada | 428/694 |
| 4,636,420 | 1/1987 | Wada | 428/156 |
| 4,659,606 | 4/1987 | Wada | 428/900 |
| 4,690,846 | 9/1987 | Wada | 428/64 |

FOREIGN PATENT DOCUMENTS 60-138730 7/1985 Japan .

*Primary Examiner*—Ellis P. Robinson
*Attorney, Agent, or Firm*—Burns, Doane, Swecker & Mathis

[57] ABSTRACT

An improved magnetic recording disc comprising: a substrate member of an alumina-based ceramic material having micropores of 5 μm or below and having a relative theoretical density of 90% or higher; a glass coating layer of a thickness of 3 to 200 μm with a surface roughness ($R_z$) of 180 angstroms or below, and being free from micropores and strain; a magnetic thin film formed on the surface of the glass coating layer; and a protective film formed thereon.

A process for production of the magnetic recording disc comprises: forming a glass coating layer to a thickness of 5 to 220 μm on the surface of an alumina-based ceramic substrate having micropores of 5 μm or below and a relative theoretical density of at least 90%; then subjecting the glass coating layer to mechanochemical polishing to a layer thickness of 3 to 200 μm, to make free from micropores and strain, and to have a surface roughness ($R_z$) of 180 angstroms or below; and further coating the surface of the glass coating layer with a magnetic thin film and a protective film.

21 Claims, 2 Drawing Sheets

MAGNETIC RECORDING DISC AND PROCESS FOR PRODUCING THE SAME

BACKGROUND OF THE INVENTION

The present invention relates to a magnetic recording disc formed of a ceramic substrate, and a process for producing such magnetic recording disc. More particularly, it is concerned with a magnetic recording disc formed of a ceramic substrate provided thereon with a glass coating layer having an improved surface roughness, substantially no air bubbles, and being free from strain due to machining; and a process for its production.

In general, the magnetic recording disc is required to have the following properties:
(1) that it is excellent in its stable floating of the magnetic head and stable recording characteristics in association with floating height of the magnetic head of as low as 0.3 micron ($\mu$m) or below;
(2) that it is free from any defects in the magnetic thin film formed on the surface of the substrate member;
(3) that it has mechanical strength sufficient to withstand machining, polishing or high speed rotation during its use with the least flexure; and
(4) that it has sufficient corrosion-resistance, weather-resistance, and heat-resistance.

Heretofore, aluminum alloys have been used as the substrate members for the magnetic recording disc. However, owing to the crystal anisotropy in the aluminum alloy materials, defects in these materials as well as non-metallic inclusions existing therein, such non-metallic inclusions are apt to remain on the surface of the aluminum alloy substrate in the form of protrusions, or they tend to separate away from the surface thereof to give rise to indents, even after the machining and polishing, with the consequence that the surface roughness ($R_z$) of about 200 angstroms at the most could only be attained notwithstanding extensive polishing work having been carried out on it. Such surface state of the material having protrusions, indents and undulations makes it difficult to realize the high density recording and the low floating height, hence it does not provide a satisfactory substrate for the high density magnetic recording disc having excellent reliability.

That is to say, the quality in the surface state, the shape and the precision in the machining of the magnetic disc substrate members directly affects the displacement of the magnetic recording disc, the speed acceleration component for the magnetic recording disc, the signal errors in the magnetic recording medium, and so forth.

Since the aluminum alloys are metallic materials, they have a Vickers' hardness on the order of Hv 100 (in the case of ceramics, it is Hv 600 or more) and a bending strength on the order of 1,000 kgf/cm$^2$ (in the case of ceramics, it is 4,000 kgf/cm$^2$ or more). For that reason, as the recording density increases, more stringent requirements are imposd upon the shape and the dimensional precision thereof in respect of scratch, flaw, surface flatness and undulation, on account of which more difficulty is accompanied in its machining.

Also, in the case of the aluminum alloy substrate members, there would be a possibility of abrasive particles being packed in the indents at the surface part of the substrate member at the time of its machining by use of abrasive particles, which entails another problem; and, moreover, in order to increase the surface-corrosion-resistance and the weather-resistance as well as to prevent the substrate member from its surface contamination, a great deal of care should be taken to secure cleanliness and rust-prevention as well as to avoid contamination, etc. in the production steps of the substrate inclusive of the lathe-turning and the polishing works, as well as in the storage period thereof.

For the purpose of improving the aluminum alloy substrate members, there has so far been proposed a method, in which a film having a high hardness is formed on the surface thereof. As an example, there has been adopted a method, in which an alumite layer is formed on the surface of the aluminum alloy substrate to increase its hardness, thereby improving its abrasive machinability. However, traces of impurities (such as Fe, Mn, Si) contained in the aluminum alloys precipitate as intermetallic compounds during formation of the alumite, which are liable to bring about the surface indents after the alumite treatment. With a view to avoiding such unfavorable phenomenon to take place, there has been practised a method, in which an undercoating layer of Ni, P, etc. is formed on the surface of the substrate member to finish its surface.

It is extremely difficult to attempt further purification of the aluminum alloy matrix from the point of view of its production process. In addition, the aluminum alloys raise a handling problem from the standpoint of their corrosion-resistance and cleanliness.

Furthermore, formation of a thin film magnetic recording medium by plating or sputtering onto the surface of the aluminum alloy poses problems in connection with the occurrence of chemical reactions and diffusion between the aluminum alloy and the magnetic thin film. There is also a problem such that, due to a heat treatment applied to the magnetic film upo its coating, deformation is caused to the aluminum alloy substrate, which would simultaneously bring about increase in the surface vibration and acceleration at the time of rotation of the substrate member (disc).

There has also been proposed a method, in which an oxide such as $SiO_2$, $Al_2O_3$ or the like is formed on the aluminum alloy substrate by sputtering. This method, however, is disadvantageous in that the adhesive force between the aluminum alloy substrate and the sputtered oxide film is weak, and also has a problem in its productivity.

Alumina-based ceramic materials have become widely used in various fields due to their superiority over the aluminum alloy materials in respect of the heat-resistance, wear-resistance, weather-resistance, insulatin, and mechanical strength. And, in order to fulfil the requirements for such magnetic disc substrate member, there is a strong demand on an alumina-based ceramic substrate member to have a surface and coated layer thereof free from any micropores and strain in association wth necessity for forming the thin film magnetic medium on the substrate member surface, and with the thinning and high densification of the recording medium.

In general, as the methods for producing the ceramic substrate member, there have been known the single-crystallization method; method, wherein the substrate is sintered after it has been shaped by metal mold forming, rubber press forming, doctor blade forming, etc.; and further the hot-pressing (HP) process as well as the hot isostatic pressing (HIP) process for obtaining the ceramic substrate having much more increased density.

However, the single-crystallization method is not only high in the production cost, but also is difficult to produce a substrate having a large diameter. While, on the other hand, the hot isostatic pressing process and the hot pressing process are capable of producing highly densified substrate, use of such ceramic substrate for the magnetic recording disc raises certain problems in its operational reliability such as occurrence of drop-outs, head crush, and so on due to minute surface defects (these methods are still liable to leave micropores of 5 $\mu$m or below in the substrate) of the resulting substrate.

In general, the mechanochemical polishing method, which is applicable to the magnetic disc substrate member, etc. as a surface polishing method, has been known to be capable of precisely finishing the surface of silicon substrates, GGG crystals, ferrite, and so on without deteriorating the surface physical properties thereof. However, when this mechanochemical polishing method is applied to ceramic materials, in which micropores exist, it renders micropores to be exposed to the surface of the ceramic material with the result that such ceramic materials are not eligible for the magnetic disc substrate members, on which a thin film magnetic medium is to be coated. On the other hand, when the mechanochemical polishing process is applied to the alumina-based ceramic substrate, there arise problems such that exposure of micropores to the surface thereof and step-difference between crystal grains occur simultaneously due to difference in the rate of chemical erosion on the surfaces of constituent materials or crystal grains.

SUMMARY OF THE INVENTION

In view of the abovementioned problems, it is a primary object of the present invention to provide a magnetic recording disc having a ceramic type substrate member which can solve the disadvantages inherent in the conventional magnetic disc substrate member composed of the ceramic material, and which has an excellent surface roughness with its surface being substantially free from the micropores and the strain due to machining.

It is a secondary object of the present invention to provide a method for producing, with ease and at a low cost, a magnetic recording disc having a ceramic type substrate member with the surface thereof being substantially free from micropores and strain.

In more detail, the present inventors conducted various studies and researches with the purpose of finding an improved ceramic type substrate for the magnetic recording disc which has an excellent surface roughness and is free from micropores and strain as required of the substrate member for the magnetic recording disc. As the result of these efforts, they have discovered that, by coating the surface of the alumina-based ceramic material with a glass coating layer, then subjecting the thus formed glass coating layer on the ceramic substrate to the mechanochemical polishing under particular conditions to thereby render the glass coating layer to have an excellent surface roughness and to be substantially free from strain, and air bubbles or micropores on its surface as well as in its interior resulting in a superior substrate member, which is the subject of an earlier U.S. patent application Ser. No. 759,366 filed on July 26, 1985 by the same applicants and the entire disclosure thereof is incorporated herein with reference thereto subject to preponderance of the disclosure herein. Further applying on the glass coating layer a magnetic thin coating film and a protective layer, there can be obtained a magnetic recording disc having an alumina-based ceramic substrate member, which recording disc satisfies the requisite conditions for the abovementioned magnetic recording disc.

That is to say, according to the present invention, in one aspect thereof, there is provided a magnetic recording disc, which comprises:
(a) a substrate member composed of an alumina-based ceramic material containing therein micropores with a size of 5 $\mu$m or below and having a relative theoretical density of 90% or higher;
(b) a glass coating layer of a thickness in a range of from 3 to 200 microns ($\mu$m), having a surface roughness ($R_z$) of 180 angstroms or below, and with the surface thereof being free from micropores and strain;
(c) a magnetic thin coating film formed on the outermost surface of said glass coating layer; and
(d) a protective coating film formed on said magnetic thin film.

According to the present invention, in another aspect thereof, there is provided a process for producing a magnetic recording disc, which comprises steps of:
(a) forming a glass coating layer to a thickness in a range of from 5 $\mu$m to 220 $\mu$m on the surface of a substrate of an alumina-based ceramic material containing therein micropores with a size of 5 $\mu$m or below and having a relative theoretical density of at least 90%;
(b) then, subjecting said glass coating layer on said substrate to mechanochomical polishing to render it to have a layer thickness of 3 to 200 $\mu$m, to be substantially free from micropores and strain, and to have a surface roughness ($R_z$) of 180 angstroms or below; and
(c) further coating the top surface of said glass coating layer with a magnetic thin coating film and a protective coating film.

The glass coating layer preferably has a relative difference in the thermal expansion coefficient between it and the substrate of $2 \times 10^{-6}$/deg.C. or below and a softening point of 400° C. or above.

The mechanochemical polishing is preferably conducted under a lapping pressure of from 0.05 to 2 kgf/cm² in a suspension liquid including at least one selected from the group consisting of $Fe_2O_3$, $SiO_2$, MgO, $CeO_2$ and $Al_2O_3$ in finely divided powder of a particle size of 0.1 $\mu$m or below, which is suspended in pure water at a rate of 0.1 to 50% by weight.

The term "polishing" used herein generally has a broad meaning embracing, e.g., lapping or buffing or the like finising process such that uses loose fine abrasives or powders in the wet state.

The term "strain-free" denotes the state such that the affected surface layer due to processing, i.e., the Beilby layer thickness is no more than 50 angstroms as measured by an Ellipsometer, the Beilby layer thickness being preferably no more than 20 angstroms.

The term "free from micropore" denotes the state such that on the surface there are micropores or indent having a diameter exceeding 0.2 micron in a number not exceeding 50/100 cm².

Since the magnetic recording disc according to the present invention has its improved surface roughness after the polishing, there can be attained stable floating of the magnetic head and stable recording characteristics at the floating height of the magnetic head of 0.3 $\mu$m or below; further, since the magnetic thin film formed on the surface of the substrate is substantially free from undesirable defects, and, moreover, it possesses a mechanical strength sufficient to be durable against high speed rotation during its machining, polishing or use, and is also excellent in its resistance to corrosion, weathering, and heat, it satisfies all the requisite conditions for the substrate member. Here, the term "free from micropores" denotes said conditions in the entire area of the glass coating layer.

The foregoing object, other objects as well as specific construction and function of the magnetic recording disc, and the process for production of such magnetic recording disc according to the present invention will become more apparent and understandable from the following detailed description thereof, when read in conjunction with the accompanying drawing.

BRIEF DESCRIPTION OF THE ACCOMPANYING DRAWING

In the drawing:

FIGS. 1A and 1B are graphical representations respectively indicating the surface state of the glass coating layer after it has been formed on the surface of a substrate and polished, and the surface state of the substrate before the coating, both being measured by a thin film step-difference measuring apparatus ("TALYSTEP" analyzer) in accordance with preferred examples of the present invention; and FIGS. 2A and 2B are respectively oscillograms obtained by observations through an oscillograph of displacement and acceleration in the vertical direction of the surface of the substrate for the magnetic recording disc according to the embodiments of the present invention, wherein FIG. 2A indicates an oscillogram of a magnetic recording disc according to the present invention, while FIG. 2B indicates that of the conventional magnetic recording disc.

DETAILED DESCRIPTION OF THE PREFERRED EMBODIMENTS

Figure 1A:
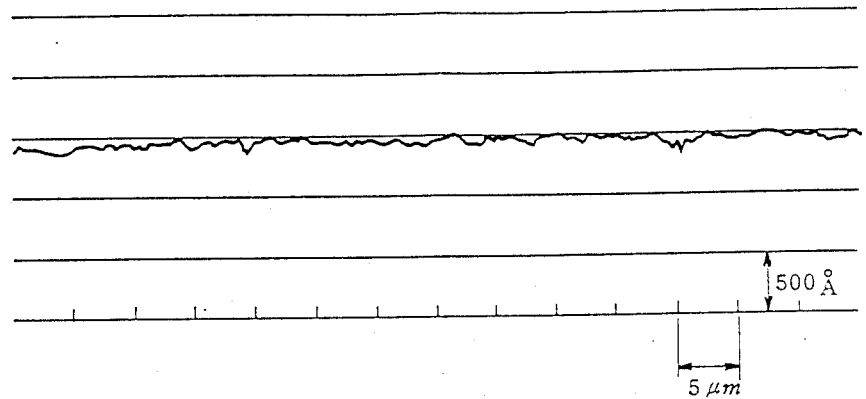

According to the present invention, the alumina-based ceramic material contains $Al_2O_3$ as a principal component and metal oxides as additional components. This material can be shaped by metal mold forming, extrusion forming, injection forming, sheet forming, and other methods, followed by sintering a shaped green body. When the micropores in the alumina-based ceramic material exceeds its size of 5 $\mu$m, there tend to occur air bubbles in this part of the micropores to deteriorate the precision in the film. On account of this, the micropores should desirably have its size of 5 $\mu$m or below, or preferably 3 $\mu$m or below.

The reason for determining the relative theoretical density of the alumina-based ceramic material to be 90% or above is that, with the relative theoretical density not reaching 90%, the size of the abovementioned micropores tends to be larger than 5 $\mu$m or above. Such density of 96% or more is preferred.

The glass material to be used for forming the glass coating layer should be such ones that satisfy the difference in the thermal expansion coefficient between it and the substrate of $2 \times 10^{-6}$/deg.C. or below and the softening point of 400° C. or above. Examples of such glass material are: soda lime glass (based on $Na_2O$-$CaO$-$SiO_2$), lead glass (based on $PbO$-$SiO_2$), barium glass (based on $BaO$-$Al_2O_3$-$SiO_2$), boro-silicate glass (based on $Na_2O$-$B_2O_3$-$SiO_2$), alumina silicate glass (based on $Al_2O_3$-$SiO_2$), lithia alumina silicate glass (based on $Li_2O$-$Al_2O_3$-$SiO_2$), and other silicate glasses; lead borate glass (based on $PbO$-$B_2O_3$-$SiO_2$), alumina borate glass (based on $RO$-$Al_2O_3$-$B_2O_3$) and other borate glasses; alumina phosphate glass (based on $R_2O$-$RO$-$Al_2O_3$-$P_2O_3$); and so forth.

The reason for setting the softening point of the glass according to the present invention at 400° C. or above is that, with the softening point of below 400° C., the thermal expansion coefficient becomes too large to conform with that of the ceramic substrate, and chemical stability becomes undesirably poor. In addition, from the standpoint of its heat-resistant property, the glass should preferably have the softening point of 400° C. or above.

When the difference in the thermal expansion coefficient between this glass coating layer and the abovementioned substrate in a temperature range of from 20° C. to the strain point (a temperature corresponding to a viscosity of the glass of about $10^{14.5}$ poises) becomes large, the mutual stress between them increases to bring about problems in warping and fracture of the glass coating layer. It is therefore necessary that the relative difference in the thermal expansion coefficient between the glass coating layer and the ceramic substrate be $2 \times 10^{-6}$/deg.C. or below. Moreover, since it is preferable that compression stress be imposed on the surface of the glass coating layer, the thermal expansion coefficient of the material for the glass coating layer should desirably be lower than that of the material for the substrate. Furthermore, it is the most preferable that the thermal expansion coefficient (20° C. to the strain point) between the glass coating layer and the abovementioned cermaic substrate has an identical trend.

Thickness of the glass coating layer before the polishing work should desirably be in a range of from 5 to 220 $\mu$m. This range of thickness is preferred for obtaining a uniform thickness of the layer by the coating method such as the glazing method, the sputtering method, the vacuum-deposition method, the ionplating method, etc., and enabling the surface polishing work to be done satisfactorily. This thickness range also serves to prevent the strain from occurring within the substrate owing to the difference in the thermal expansion coefficient between the glass coating layer and the substrate.

The thickness of the glass coating layer after the polishing work should be such that it uniformly covers the alumina substrate without its being exposed to the surface. Considering the precision in the polishing work, the thickness of the layer is required to be 3 $\mu$m or more. However, when it exceeds 200 $\mu$m, there is an apprehension such that a large strain would be created within the substrate member due to a stress caused by the difference in the thermal expansion coefficient between the glass coating layer and the substrate, hence the thickness of the glass coating layer is set in a range of from 3 $\mu$m to 200 $\mu$m.

The reason for setting the surface roughness ($R_z$) of the glass coating layer to be 180 angstroms or less is that, when it exceeds 180 angstroms, the recording characteristics of the magnetic recording disc becomes deteriorated. A more preferred range of the surface roughness is 150 angstroms or less. According to the preferred embodiment of the present invention, a surface roughness of 80 angstroms, or more favorably 40 angstroms or less, or 30 angstroms or less can even be achieved.

The polishing work on the glass coating layer may be successfully effected under a lapping pressure in a range of from 0.05 to 2 kgf/cm² in a suspension liquid containing therein at least one kind of substance selected from the group consisting of $SiO_2$, $MgO$, $CeO_2$ and $Al_2O_3$ in finely divided powder having a particle diameter of 0.1 μm or below, which is suspended in pure water at a rate of from 0.1% by weight to 50% by weight. When the particle size exceeds 0.1 μm, flaws result on the surface of the glass coating layer to unfavorably deteriorate the surface roughness. When the content of the finely divided powder in the suspension liquid does not reach 0.1% by weight, the polishing effect is poor, and, on the other hand, when its content exceeds 50% by weight, the polishing resistance increases with increase in viscosity of the suspension liquid due to the increased amount of the finely divided powder, hence the content of such very fine powder to be present in the suspension liquid is set in a range of from 0.1% by weight to 50% by weight. Most of such powders are synthetic and may be crystalline, while some of them ($Al_2O_3$, $CeO$) may be particulated powder of the natural products.

Pure water should not contain therein any organic contaminants and floating substances, for which ion-exchanged water and distilled water are suited.

For the lapping device, a soft metal such as lead, solder alloys, tin, and so forth, or hard cloth are suitable.

With a lapping pressure not reaching 0.05 kgf/cm², the required surface roughness of the glass coating layer cannot be obtained, and moreover, the machining efficiency thereon is poor. On the contrary, when the lapping pressure exceeds 2 kgf/cm², it would be favorable for the machining efficiency per se, but the polishing precision becomes poor, hence the lapping pressure is set in a range of from 0.05 to 2 kgf/cm².

In the present invention, there may be used γ-$Fe_2O_3$, Co-Cr, Co-Ni, Co-P, Ba-ferrite, Cr, Fe-Ni, and so forth as the materials for the magnetic thin film or the undercoating film to be formed on the surface of the glass coating layer having a difference in the thermal expansion coefficient, a softening point, and a surface roughness, all of specific thereto, and being free from micropores and strain.

Further, films of $SiO_2$, C, $Si_3N_4$, $Al_2O_3$ and so on may be formed over the magnetic thin film as the protective film by means of sputtering method, spin-coating method, etc.. There may also be used the protective film formed by the glow-discharge polymerization, which, however, has not a high adhesive force with the magnetic thin film hence it is liable to peel off easily. For the thin film forming method, there may generally be adopted the sputtering method, by which the undercoating film, the magnetic thin film, and the protective film can be formed.

The alumina-based ceramic material according to the present invention is principally composed of $Al_2O_3$, in the case of forming the glass coating layer by the sputtering method, such as $Al_2O_3$, $Al_2O_3$-TiC system, $Al_2O_3$-$TiO_2$ system, $Al_2O_3$-$Fe_2O_3$-TiC system, and so forth (at a rate of 50% by weight, or preferably 70% by weight of $Al_2O_3$); or besides the above, those additionally containing metal oxides.

Typicals of the preferred alumina-based ceramic materials embrace followings:

(1) sintered alumina (preferably having purity of 96% or more)

(2) $Al_2O_3$-TiC-$TiO_2$ system (e.g., JP-Patent-Kokai Publication No. 57-135772)
 (i) TiC+$TiO_2$=30-50 wt %, and $Al_2O_3$=balance

| (ii) (i) provided that $[TiO_2/(TiC + TiO_2)] \times 100 = 5 - 15$ wt % | 100 parts by wt |
|---|---|
| at least one of MgO, NiO, $Cr_2O_3$ and $ZrO_2$: | 0.5–5 parts by wt |
| $Y_2O_3$: 0.05–2 parts by wt | |

(3) $Al_2O_3$-$TiO_2$ system (e.g., JP-Patent-Kokai Publication No. 57-198578)
 (i) $TiO_2$=20-60 wt %, and $Al_2O_3$=balance
 (ii) (i)=100 parts by wt at least one of CaO, MgO and $Y_2O_3$: 0.5–5 parts by wt $ZrO_2$: 0.5–10 parts by wt (4) $Al_2O_3$-$Fe_2O_3$-TiC system (e.g., JP-Patent-Kokai Publication No. 58-1854)
 (i) TiC=10–30 wt %, and $Al_2O_3$-$Fe_2O_3$ solid solution*=balance
 (ii) (i)=100 parts by wt at least one of CaO, MgO and $Y_2O_3$=0.5–5 parts by wt ZrO=0.5–10 parts by wt
 *N.B. $Al_2O_3$:$Fe_2O_3$=1:1 by mol In the case of forming the glass coating layer by the glazing method, the alumina-based ceramic material should preferably be composed of $Al_2O_3$-$TiO_2$ system, and so forth, which contains $Al_2O_3$ as the principal component; or besides these, those additionally containing metal oxides. These alumina-based ceramic materials may preferably be shaped by metal mold forming, rubber press forming, doctor blade forming, or other forming methods, followed by press sintering treatment of the shaped body such as hot press (HP) process or the hot isostatic pressing (HIP) process. The alumina-based ceramic composition may also contain therein known type of grain growth inhibitors such as MgO, NiO, $Cr_2O_3$, etc. and other sintering aids.

The material for the alumina-based ceramic substrate should preferably have an average crystal grain size of 5 μm or less, and a relative theoretical density (density relative to the theoretical density) of 90% or above, which is readily available commercially as the standard product at a low cost.

In the present invention, the formation of the glass coating layer onto the alumina-based ceramic substrate is done by various coating methods such as glazing method; vapor deposition techniques like sputtering method, vacuum-deposition method, ion-plating method; and so forth. These methods enable a uniform film thickness to be obtained and the surface polishing to be effected.

It may be worthy of note that, upon formation of the glass coating layer, if an $SiO_2$ film is first formed and then a required glass coating is effected, the wetting property between the substrate and the coating glass can be improved.

The glass to be used for the sputtering method should preferably have a high softening point, out of those various glasses as mentioned in the foregoing, of 500° C. or higher (preferably 700° C. or higher), because of its higher target strength and its capability of increasing a load voltage to the target.

The glass to be used for the glazing method should preferably have its softening point in a range of from 400° C. to 900° C. (preferably 500° C. or higher). With the softening point not reaching 400° C., the thermal expansion coefficient becomes too large to meet the thermal expansion coefficient of the substrate, and the chemical stability of the glass coating layer is unfavorably sacrificed. On the contrary, when the softening point exceeds 900° C., the heat treatment temperature becomes unfavorably high to cause deformation in the substrate.

Thickness of the glass coating layer to be formed on the alumina-based ceramic material according to the present invention may be selected depending on its purpose and the class of material to be used. Where the glazing method is employed for coating onto the substrate, difficulty is involved in maintaining the uniform thickness of the coating, if the thickness of the coating layer is below 10 $\mu$m. It is also difficult to make the coating layer surface pore-free and strain-free, and to render it to have the required surface roughness by means of the mechanochemical polishing process under the afore-mentioned conditions. With a coating layer thickness exceeding 220 $\mu$m, there would occur apprehension such that a difference in the thermal expansion coefficient between the glass coating layer and the alumina substrate gives rise to a large amount of stress which, in turn, possibly leads to a considerable strain within the resultant substrate member, and further would deteriorate precision in the thickness of the coating layer. It is therefore required in this case that thickness of the coating layer be in a range of from 10 $\mu$m to 220 $\mu$m.

Where the sputtering method is adopted for coating, difficulty is involved in maintaining the uniform thickness of the coating layer, if the layer thickness is below 5 $\mu$m. It is also difficult to make the film surface pore-free and strain-free, and to render it to have the required surface roughness by means of the mechanochemical polishing process. With a layer thickness exceeding 220 $\mu$m, there would occure apprehension such that a difference in the thermal expansion coefficient between the glass coating layer and the alumina substrate gives rise to a large amount of stress which, in turn, possibly leads to a considerable strain in the resultant substrate member. It is therefore required that the layer thickness be in a range of from 5 $\mu$m to 220 $\mu$m. Further, from the standpoint of the film-forming rate, the coating layer thickness should preferably be in a range of from 15 $\mu$m to 25 $\mu$m.

In consideration of precision in the polishing work, the thickness of the coating film after the mechanochemical polishing work may be in a range of from 3 $\mu$m to 200 $\mu$m in the case of adopting the glazing method, while it is in a range of from 3 $\mu$m to 200 $\mu$m, or more preferably from 10 $\mu$m to 200 $\mu$m in the case of adopting the sputtering method.

Thickness of the undercoating layer, the magnetic thin film, and the protective film may be such that, in the case of using Co-Ni as the magnetic thin film, a Cr-layer as the undercoating is in a range of from 1,000 to 4,000 angstroms, the magnetic thin film is in a range of from 400 to 1,000 angstroms, and the protective film is in a range of from 200 to 800 angstroms; in the case of using $\gamma$-Fe$_2$O$_3$, the magnetic thin film is formed to have its film thickness ranging from 500 to 2,000 angstroms; and, in the case of using Ba-ferrite, the magnetic thin film is in a range of from 500 to 4,000 angstroms.

A further HIP treatment can be applied after the glass coating layer has been applied to reduce the size and number of pores. Under the suitable conditions the pore number exceeding 0.2 $\mu$m (or most preferably 0.1 $\mu$m) per sheet can be reduced to less than 10 (or most preferably 5). The HIP treatment may be conducted for about 10 minutes or more, preferably up to 60 minutes at a temperature corresponding to viscocity of the glass material of $10^6$–$10^8$ peises under a pressure of 10–2000 kgf/cm$^2$, preferably 100–800 kgf/cm$^2$.

The resultant glass coating layer surface has a Bailby layer thickness of less than 50 angstroms, or preferably 20 angstroms.

Since the magnetic recording disc according to the present invention is excellent in its surface roughness of the substrate member, there can be obtained stable floating of the magnetic head as well as stable recording characteristics at the floating height of the magnetic head of 0.3 $\mu$m or below. Further, the magnetic thin film formed on the surface of the substrate member is free from any defects, and moreover, the substrate member possesses a mechanical strength sufficient to be durable against high speed rotation during its machining, polishing or use, and is also excellent in its resistance to corrosion, weathering, and heat; hence it satisfies all the resuisite conditions for the magnetic recording disc.

In case the magnetic recording disc according to the present invention is used as the magnetic disc for recording on both surfaces, the glass coating layer is formed on both surfaces of the alumina-based ceramic substrate, and then the glass coating layers thus formed on both surfaces are subjected to the simultaneous mechanochemical polishing works to thereby offset the internal stress in this layer of glass on both surfaces of the substrate, whereby the substrate member having an excellent surface flatness and surface roughness, and being substantially free from micropores and strain is obtained.

The magnetic recording disc according to present invention, which is provided with the magnetic thin film on the outermost surface of an alumina-based ceramic substrate with a predetermined glass coating layer having been formed on it, has various advantages such that control of precision in its dimension during the polishing work effected on the abovementioned substrate can be done more easily than that of the conventional disc substrate member; that there is no necessity for paying particular attention to the corrosion-resistant property and the weather-resistant property of the substrate per se, and that contamination of its surface can be removed by sputter-cleaning at the time of forming the glass coating layer by the sputtering technique.

Further, in contrast to the fact that the conventional magnetic recording disc having the aluminum alloy substrates leave on their surface a layer affected by machining when the alloy substrate is machined by the lathe-turning, the magnetic recording disc having the alumina-based ceramic substrate member according to the present invention has such advantage that no difference in the strain is brought about on its surface by the stress occurred between the surface and the substrate bulk body due to the mechanochemical polishing, hence there takes place no transfer of the strain onto the magnetic thin film to be coated on the ceramic substrate member.

As described in the foregoing, by use of such magnetic disc substrate member according to the present invention, it becomes possible to produce a high density magnetic disc recording merium of high operational reliability. In addition, the magnetic recording disc of the present invention is excellent in its heat resistant property in comparison with the conventional magnetic recording disc having the aluminum alloy substrate, even when it is used in the opto-magnetic recording where the recording and reproduction are carried out by use of laser beam.

With a view to enabling those persons skilled in the art to put the present invention into practice, a couple of preferred examples are present in the following.

EXAMPLE 1

As a substrate, use was made of an alumina-based ceramic disc plate having a diameter of 130 mm and a thickness of 2 mm. The substrate was composed of 96% by weight of $Al_2O_3$ and the remainder of a sintering aids of $TiO_2$ and TiC. The substrate was then subjected to the hot isostatic pressing treatment after its compression-molding. It contained therein micropores, each having a size of 5 $\mu$m or below, had an average crystal grain size of 4.0 $\mu$m, a relative theoretical density of 97% and a thermal expansion coefficient of $72 \times 10^{-7}$/deg.C.

Subsequently, the surface of the abovementioned alumina-based ceramic disc plate was polished precisely to a surface roughness of 1 $\mu$m or below by means of the precision lapping method. Following this, a $PbO$-$SiO_2$-$B_2O_3$-based glass (60% by weight of PbO, 30% by weight of $SiO_2$, and 10 by weight of $B_2O_3$) having a thermal expansion coefficient (20° C. to the strain point) of $65 \times 10^{-7}$/deg.C., a softening point of 590° C., and an average particle size passing through a 300-mesh sieve was made into a pasty form. The paste was then applied onto the polished surface of the abovementioned substrate to a thickness of 100 $\mu$m by the spin-coating method at a number of revolution of 800 rpm, after which it was subjected to glass coating in the air at a temperature of 1,050° C. for four hours.

The rate of the temperature elevation at the time of the glass coating was 300° C./hr. The cooling rate was 300° C./hr. until the strain point, at which the glass-coated substrate was maintained for one hour to remove the strain, after which it was gradually cooled. The resulted glass coating layer had a thickness of 60 $\mu$m. No air bubbles exceeding 0.2 $\mu$m could be observed in the glass coating layer.

In the next place, the glass coating layer thus formed was subjected to the polishing work in a suspension liquid containing therein $CeO_2$ in finely divided powder having a particle size of 0.3 $\mu$m, which was suspended in pure water at a rate of 20% by weight, under a lapping pressure of 0.5 $kgf/cm^2$ by use of a cloth lap as a lapping device, thereby finishing the glass coating layer to a surface roughness ($R_z$) of 120 angstroms. In this case, allowance for the polishing was 20 $\mu$m and the surface flatness was 1 $\mu$m.

By means of a thin film step-difference measuring apparatus having a contact stylus of 0.1 $\mu$m in radius ("TALYSTEP" analyzer), the surface state of the glass coating layer after the abovementioned polishing was measured. FIG. 1A indicates the result of the measurement. In the same manner, the surface state of the substrate prior to the glass coating was measured, the result of which is shown in FIG. 1B.

Figure 1B:
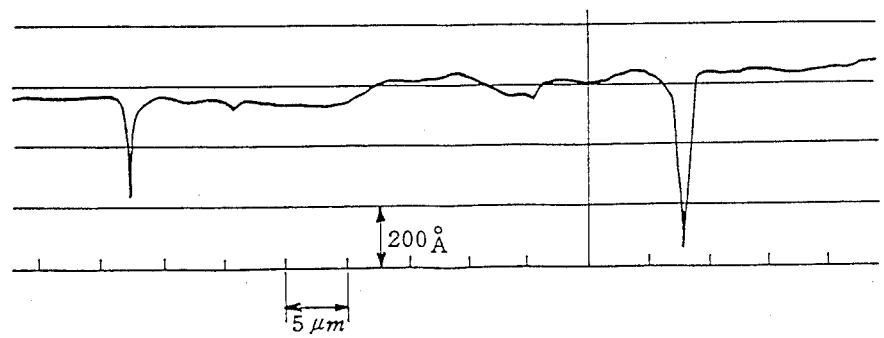

From FIGS. 1A and 1B, it is apparent that the micropores in the surface of the alumina-based glass coated ceramic substrate have been eliminated therefrom by the polishing work of the glass coating layer, whereby the surface was finished to have its roughness ($R_z$) of 130 angstroms.

The defects (pores) exposed in the resultant surface were measured, and defects exceeding 0.2 $\mu$m and up to 3 $\mu$m were about 50 per sheet (38/100 $cm^2$). The Bailby layer thickness measured by an Ellipsometer showed 20 angstroms or less.

As the method for judging the adhesive strength between the gass coating layer and the substrate, a hardness meter was used to measure occurrence of peeling of the glass coating layer from the substrate, as the standard for judging the adhesive strength, by gradually increasing the load from 50 gf to 1,000 gf, whereupon it was found out that no peeling of the glass coating layer occurred with the load of upto and including 1,000 gf, which indicated that the adhesive strength was sufficiently high.

In the next place, the abovementioned glass coating layer was formed on the surface of the substrate member, after which the undercoating film, the magnetic thin film, and the protective film were formed on the glass coating layer, in the order as mentioned, by us of a radio frequency (RF) magnetron sputtering device (with the size of a target being 355 mm in diameter) in the following manner.

The glass-coated substrate member was placed in a vacuum vessel, and then the interior of the vacuum vessel was evacuated to a degree of vacuum of $10^{-7}$ torr or so, followed by feeding of argon gas into it to thereby adjust the internal pressure to $5 \times 10^{-3}$ torr.

Since the substrate was an insulating body, it was subjected to the radio frequency sputtering to clean the surface thereof. Further, in advance of forming a Co-Ni magnetic thin film on the glass coating layer, a chromium (Cr) undercoating film was formed onto its surface to a thickness of 2,500 angstroms so as to accelerate epitaxial growth of the magnetic thin film and to improve the coercive force Hc. Thereafter, the Co-Ni film was successively coated on this undercoating film to a thickness of 500 angstroms, and then a carbon (C) film as a protective film was coated on this magnetic thin film to a thickness of 500 angstroms, thereby producing a magnetic recording disc according to the present invention. In this case, with a view to attaining the favorable modulation, the substrate was fixed in the vacuum vessel, and the abovementioned three kinds of thin films were formed thereon in succession.

The thus obtained magnetic recording disc according to the present invention, unlike the plated recording medium, is free from any protrusions, so that there was no necessity for applying varnish. Also, the magnetic characteristic of this magnetic recording disc, when measured by use of a vibrating sample type magnetometer (V.S.M.), was found to have its coercive force Hc of 750 Oe and its loop squareness ratio* s of 0.8. (*definition: s=Mr/Ms) Incidentally, by appropriate selection of the compositional ratio of Co-Ni, the thickness of the magnetic film, and the thickness of the Cr-undercoating film, the value of the coercive force Hc can be adjusted in a range of from 300 to 1,200 Oe.

Furthermore, the modulation attained by use of a certifier was within ±5%. The floating property of the magnetic disc using the thin film magnetic head did not raise any problem, even when the spacing was reduced to 0.15 microns. Also, in connection with the contact-start-stop resistance test (C.S.S.-test), the test result revealed the operating life of as long as 30,000 times or more.

The magnetic recording disc is in general used at a rotational speed as high as 3,600 rpm, and the aluminum alloy constituting the substrate member for the magnetic disc is a ductile material. However, in the case of the ceramic disc according to the present invention, as it is apprehended that the disc might bring about brittle fracture by extension of cracks therein, the obtained magnetic disc was subjected to a mechanical dynamic precision test at an ultra-high rotational speed of 10,000 rpm which is three or more times as high as the practical condition. No breakage of the disc could be observed.

Figure 2A:
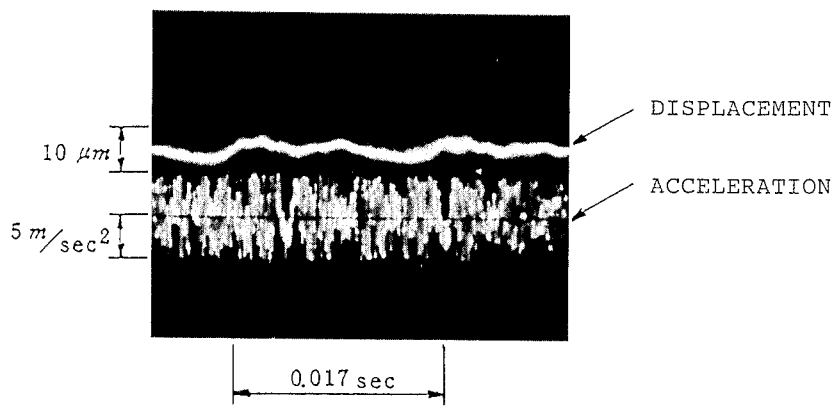

Following this, when displacement and acceleration in the vertical direction of the surface of the magnetic disc substrate was measured for 1,000 sheets of the magnetic discs, it was found that the displacement at the outermost periphery of the disc was 5 microns or below, and the acceleration was 5 m/sec$^2$ or below. FIG. 2A is the oscillogram showing the result of observation of this measurement through an oscilloscope. For the measurement, use was made of a static capacitance type sensor (having a sensor diameter of 1.7 mm—a product of ADE Corp.) and a measuring meter (type 3132A—a product of ADE Corp).

For the sake of comparison, the displacement and the acceleration of the conventional magnetic disc using the aluminum alloy substrate were measured in the same manner as above. The results of the measurements are shown by an oscillogram in FIG. 2B.

Figure 2B:
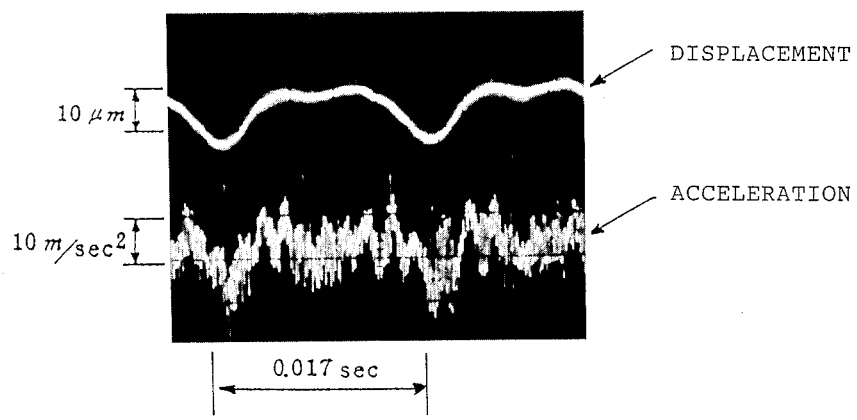

As is apparent from FIGS. 2A and 2B, the magnetic recording disc according to the present invention has no risk of head crush in comparison with the conventional magnetic disc using the aluminum alloy substrate member, which can be well used with the low floating type slider with a floating height of 0.3 microns or below; furthermore, it has a high Young's modulus of elasticity which is sufficiently durable against stress deformation, and has a higher hardness than the plated Ni-P, hence it is evaluated to be a magnetic recording disc which can meet, with high reliability, the requirement for high density recording which will make further progress in future.

EXAMPLE 2

As a substrate, use was made of an $Al_2O_3$-$TiO_2$-based ceramic disc plate having a diameter of 90 mm and a thickness of 1.5 mm. The substrate was composed of 65% by weight of $Al_2O_3$ and the remainder of $TiO_2$. It was subjected to hot press treatment after it has been shaped. It contained therein micropores, each having a size of 3 μm or below, had an average grain size of 4 μm, a relative theoretical density of 99%, and a thermal expansion coefficient (20° C. to the glass strain point) of $78 \times 10^{-7}$/deg.C.

Subsequently, the surface of the abovementioned $Al_2O_3$-$TiO_2$-based ceramic substrate was precisely polished to a surface roughness of 200 angstroms or below by means of a precision lapping method.

After this precise polishing, a glass coating layer was formed on this substrate to a thickness of 20 microns by a sputtering method using a target plate having a diameter of 350 mm and a thickness of 6 mm, which was made of a CaO-BaO SiO$_2$-based glass (composed of 30% by weight of BaO, 50% by weight of SiO$_2$ with the balance being $K_2O$, $Na_2O$, and so on) havig a thermal expansion coefficient (20° C. to the glass strain point) of $65 \times 10^{-7}$/deg.C., a softening point of 50° C., and a strain point of 670° C. The sputtering was carried out by means of a high frequency sputtering device, in which, after an argon pressure for the sputtering reached a value of $1 \times 10^{-5}$ mbar through evacuation, an electric power of 5 kW was imparted for the normal sputtering, and a negative bias voltage ($-50V$) was applied to the substrate.

In the next place, the glass coating layer thus formed was subjected to polishing work in a suspension liquid containing therein SiO$_2$ in finely divided powder having a particle size of 0.5 μm, which was suspended in pure water at a rate of 20% by weight, under a lapping pressure of 1 kgf/cm$^2$ by use of a hard cloth as the lapping device, thereby finishing the glass coating layer to the surface roughness ($R_z$) of 100 angstroms. In this case, allowance for the polishing was 10 μm and the surface flatness of 1 μm.

By means of the thin film step-difference meter ("TALYSTEP" analyzer) having a contact stylus of 0.1 μm in radius, the surface of the glass coating layer after the polishing and the surface state of the substrate prior to the glass coating were measured, whereupon results like those shown in FIGS. 1A and 1B, respectively, were obtained.

Also, when the undercoating film, the magnetic thin film and the protective film were formed in the same manner as in Example 1 above, there could be obtained the same recording characteristics.

In the foregoing, the present invention has been described in specific details with reference to the preferred examples thereof. It should, however, be noted that these examples are only illustrative of the present invention, and not so restrictive, and that any changes and modifications may be made by those persons skilled in the art within the scope of the present invention as recited in the appended claims.

What is claimed is:

1. A magnetic recording disc, which comprises:
  (a) a substrate member of a nalumina-based ceramic material containing therein micropores witha size of 5 μm or below and having a relative theoretical density of 90% or higher;
  (b) a glass coating layer having a thickness of from 3 μm to 200 μm, having a surface roughness ($R_z$) of 180 angstroms or below and a softening point of 400°-900° C., containing no more than 50 per 100 cm$^2$ micropores having a size exceeding 0.2 μm, and being free from strain with a Beilby layer thickness of no more than 50 angstroms;
  (c) a magnetic thin coating film disposed on the surface of said glass coating layer; and
  (d) a protective coating film formed on said magnetic thin film.

2. A magnetic recording disc as set forth in claim 1, wherein said micropores in the surface of said substrate member has a size of 3 μm or below.

3. A magnetic recordimg disc as set forth in claim 1, wherein the surface roughness of said glass coating layer is in a range of from 50 angstroms to 150 angstroms.

4. A a magnetic recording disc as set forth in claim 1, wherein the surface of said glass coating layer has a Beilby layer thickness of no more than 20 angstroms.

5. A magnetic recording disc as set forth in claim 1 or 4, wherein the surface of said glass coating layer contains micropores having a diameter of 0.1 μm or below.

6. A magnetic recording disc as set forth in claim 1, wherein the surface of said glass coating layer has a Bailby layer of a thickness of 50 angstroms or below.

7. A magnetic recording disc as set forth in claim 6, wherein the surface of said glass coating layer has a Bailby layer of thickness of 20 angstroms or below.

8. A magnetic recording disc as set forth in claim 1, wherein said glass coating layer is formed by at least one method of glazing and physical vapor deposition.

9. A magnetic recording disc as set forth in claim 1, wherein said glass coating layer has a difference in the thermal expansion coefficient between it and said alumina-based ceramic substrate of $2 \times 10^{-6}/\deg.C$.

10. A magnetic recording disc as set forth in claim 1, wherein said protective film formed on the outermost surface of said substrate is composed of at least one substance selected from the group consisting of $SiO_2$, C, $Si_3N_4$ and $Al_2O_3$.

11. A magnetic recording disc as set forth in claim 8, wherein the glass coating layer has been formed by sputtering and has a softening point of 500° C. or above.

12. A magnetic recording disc according to claim 10, wherein said glazed glass coating layer has its thickness in a range of from 3 μm to 200 μm.

13. A magnetic recording disc as set forth in claim 11, wherein said sputtered glass coating layer has its thickness in a range of from 10 μm to 200 μm.

14. A magnetic recording disc as set forth in claim 1, wherein said alumina-based ceramic substrate material is a sintered body of a material selected from the group consisting of $Al_2O_3$ system, $Al_2O_3$-TiC system, $Al_2O_3$-$TiO_2$ system, and $Al_2O_3$-TiC-$Fe_2O_3$ system.

15. A magnetic recording disc as set forth in claim 1, wherein said magnetic thin film is formed of at least one substance selected from the group consisting of γ-$Fe_2O_3$, Co-Cr system, Co-Ni system, Co-P system, Ba-ferrite, Cr, and Fe-Ni system.

16. A magnetic recording disc as set forth in claim 1, 15 or 10, wherein said magnetic thin film and said protective film is formed by at least one method of sputtering, spin-coating, and glow-discharge polymerization.

17. A process for producing a magnetic recording disc, which comprises the steps of:

(a) forming a glass coating layer of a glass having a softening point of from about 400°-900° C. to a thickness in a range of from 5 μm to 220 μm on the surface of an alumina-based ceramic substrate containing therein micropores with a size of 5 μm or below having a relative theoretical density of at least 90% or above;

(b) then, subjecting said glass coating layer on said substrate to mechanochemically polishing process to render it to have a surface roughness ($R_z$) of 180 angstroms or less, to contain no more than 50 micropores having a size exceeding 0.2 μm per 100 $cm^2$, to be free from strain with a Beilby layer thickness of no more than 50 angstroms, and to have layer thickness in a range of from 3 μm to 200 μm; and (c) further coating the surface of said glass coating layer with a magnetic thin film and protective film.

18. A process for producing a magnetic recording layer as set forth in claim 17, wherein said glass coating layer is formed by glazing in a thickness, prior to said mechanochemical polishing process, being in a range of from 10 μm to 220 μm.

19. A process for producing a magnetic recording disc as set forth in claim 17, wherein said glass coating layer is coated by sputtering in a thickness, prior to said mechanochemical polishing, being in a range of from 5 μm to 220 μm.

20. A process for producing a magnetic recording disc as set forth in claim 17, wherein the thickness of said sputtered glass coating layer prior to said mechanochemical polishing is in a range of from 15 μm to 25 μm.

21. A process for producing a magnetic recording disc as set forth in claim 17, wherein said mechanochemical polishing is effected with a suspension liquid containing therein at least one kind of substance selected from the group consisting of $Fe_2O_3$, $SiO_2$, MgO, $CeO_2$ and $Al_2O_3$ in finely divided powder having a particle diameter of 0.1 μm or below, which is suspended in pure water, and under a lapping pressure in a range of from 0.05 $kgf/cm^2$ to 2.0 $kgf/cm^2$.

* * * * *